United States Patent
Walker et al.

(10) Patent No.: US 9,288,780 B2
(45) Date of Patent: Mar. 15, 2016

(54) METHOD FOR CONTROLLING A COMMUNICATION NETWORK, SERVERS AND SYSTEM INCLUDING SERVERS, AND COMPUTER PROGRAMS

(75) Inventors: John Michael Walker, Den Haag (NL); Francisco Cortes Gomez, Würselen (DE); Lars-Bertil Olsson, Angered (SE); Maria Esther Terrero Díaz-Chirón, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1125 days.

(21) Appl. No.: 13/256,092

(22) PCT Filed: Feb. 17, 2009
(Under 37 CFR 1.47)

(86) PCT No.: PCT/EP2009/051845
§ 371 (c)(1),
(2), (4) Date: May 24, 2012

(87) PCT Pub. No.: WO2010/094319
PCT Pub. Date: Aug. 26, 2010

(65) Prior Publication Data
US 2012/0246255 A1    Sep. 27, 2012

(51) Int. Cl.
*G06F 15/16* (2006.01)
*H04W 60/00* (2009.01)
*H04W 88/06* (2009.01)

(52) U.S. Cl.
CPC ............ *H04W 60/005* (2013.01); *H04W 88/06* (2013.01)

(58) Field of Classification Search
None
See application file for complete search history.

(56) References Cited

U.S. PATENT DOCUMENTS 6,847,610 B1 * 1/2005 Suumaki ............ H04L 12/5695
370/230.1
7,010,315 B1 * 3/2006 Pan ...................... H04W 72/005
455/416

(Continued)

FOREIGN PATENT DOCUMENTS

| CN | 101282582 A | 10/2008 |
|---|---|---|
| WO | 03/101131 A1 | 12/2003 |

(Continued)

OTHER PUBLICATIONS

3rd Generation Partnership Project. 3GPP TS 23.401, V8.0.0 (Dec. 2007). 3rd Generation Partnership Project; Technical Specification Group Services and System Aspects; General Packet Radio Service (GPRS) enhancements for Evolved Universal Terrestrial Radio Access Network (E-UTRAN) access (Release 8). Dec. 2007.

(Continued)

*Primary Examiner* — Hamza Algibhah
*Assistant Examiner* — James Edwards
(74) *Attorney, Agent, or Firm* — Coats & Bennett, P.L.L.C.

(57) ABSTRACT

A method for operating a communication network includes at least two radio access networks (10-1, 10-2) in which a user equipment (12) can simultaneously be registered and, for each of the at least two radio access networks (10-1, 10-2), a serving entity (14-1, 14-2) in the control plane. The method including the steps of assigning (s16) a master role to one serving entity (14-2) and a slave role to the other serving entity (14-1) or entities; and when a serving entity (14-1) to which a slave role is assigned has to perform control plane signalling (s18), transmitting (s20), by the serving entity, a signalling message to the serving entity (14-2) to which the master role is assigned, so as to perform (s22) the control plane signalling Servers acting as serving entities, systems including such servers, and computer programs executable on the servers are also disclosed.

27 Claims, 10 Drawing Sheets

(56) References Cited

U.S. PATENT DOCUMENTS

| | | | |
|---|---|---|---|
| 7,245,933 B1* | 7/2007 | Pan | H04W 72/005 455/416 |
| 2004/0017798 A1* | 1/2004 | Hurtta | H04L 29/12009 370/352 |
| 2006/0039327 A1* | 2/2006 | Samuel | H04W 36/14 370/331 |
| 2006/0050667 A1* | 3/2006 | Verma | H04L 12/4633 370/338 |
| 2006/0210079 A1 | 9/2006 | Kato | |
| 2006/0215625 A1* | 9/2006 | Hempel | H04B 7/2628 370/342 |
| 2006/0246899 A1* | 11/2006 | Buckley | H04W 48/12 455/435.2 |
| 2007/0060097 A1* | 3/2007 | Edge | H04L 65/4007 455/404.1 |
| 2007/0072605 A1* | 3/2007 | Poczo | H04L 67/30 455/432.2 |
| 2008/0020775 A1* | 1/2008 | Willars | H04L 47/10 455/445 |
| 2008/0025263 A1* | 1/2008 | Pelkonen | H04W 36/0066 370/332 |
| 2008/0242302 A1* | 10/2008 | Pulkkinen | H04W 24/02 455/436 |
| 2008/0248804 A1* | 10/2008 | Al-Bakri | H04W 76/025 455/450 |
| 2009/0016334 A1* | 1/2009 | Forsberg | H04W 28/06 370/389 |
| 2009/0036146 A1* | 2/2009 | Lamba | H04W 8/12 455/456.3 |
| 2009/0119655 A1* | 5/2009 | Quilty | G06F 8/65 717/168 |
| 2009/0129342 A1* | 5/2009 | Hwang | H04W 36/0022 370/331 |
| 2009/0270099 A1* | 10/2009 | Gallagher | H04W 8/08 455/435.1 |
| 2009/0296660 A1* | 12/2009 | Weng | H04W 36/0022 370/332 |
| 2010/0095123 A1* | 4/2010 | He | H04L 63/1441 713/171 |
| 2010/0299419 A1* | 11/2010 | Ramankutty | H04W 24/02 709/221 |
| 2011/0065450 A1* | 3/2011 | Kazmi | G01S 5/0252 455/456.1 |
| 2011/0300833 A1* | 12/2011 | Shaw | H04M 3/53333 455/413 |
| 2012/0021772 A1* | 1/2012 | Drennan | H04W 4/02 455/456.3 |
| 2012/0177003 A1* | 7/2012 | Chan | H04W 36/0066 370/331 |
| 2012/0225651 A1* | 9/2012 | Rysgaard | H04W 60/005 455/435.1 |

FOREIGN PATENT DOCUMENTS

| | | |
|---|---|---|
| WO | 2008/087518 A4 | 7/2008 |
| WO | 2008/088258 A1 | 7/2008 |

OTHER PUBLICATIONS

3rd Generation Partnership Project. 3GPP TS 23.401, V8.4.1 (Dec. 2008). 3rd Generation Partnership Project; Technical Specification Group Services and System Aspects; General Packet Radio Service (GPRS) enhancements for Evolved Universal Terrestrial Radio Access Network (E-UTRAN) access (Release 8). Dec. 2008.

* cited by examiner

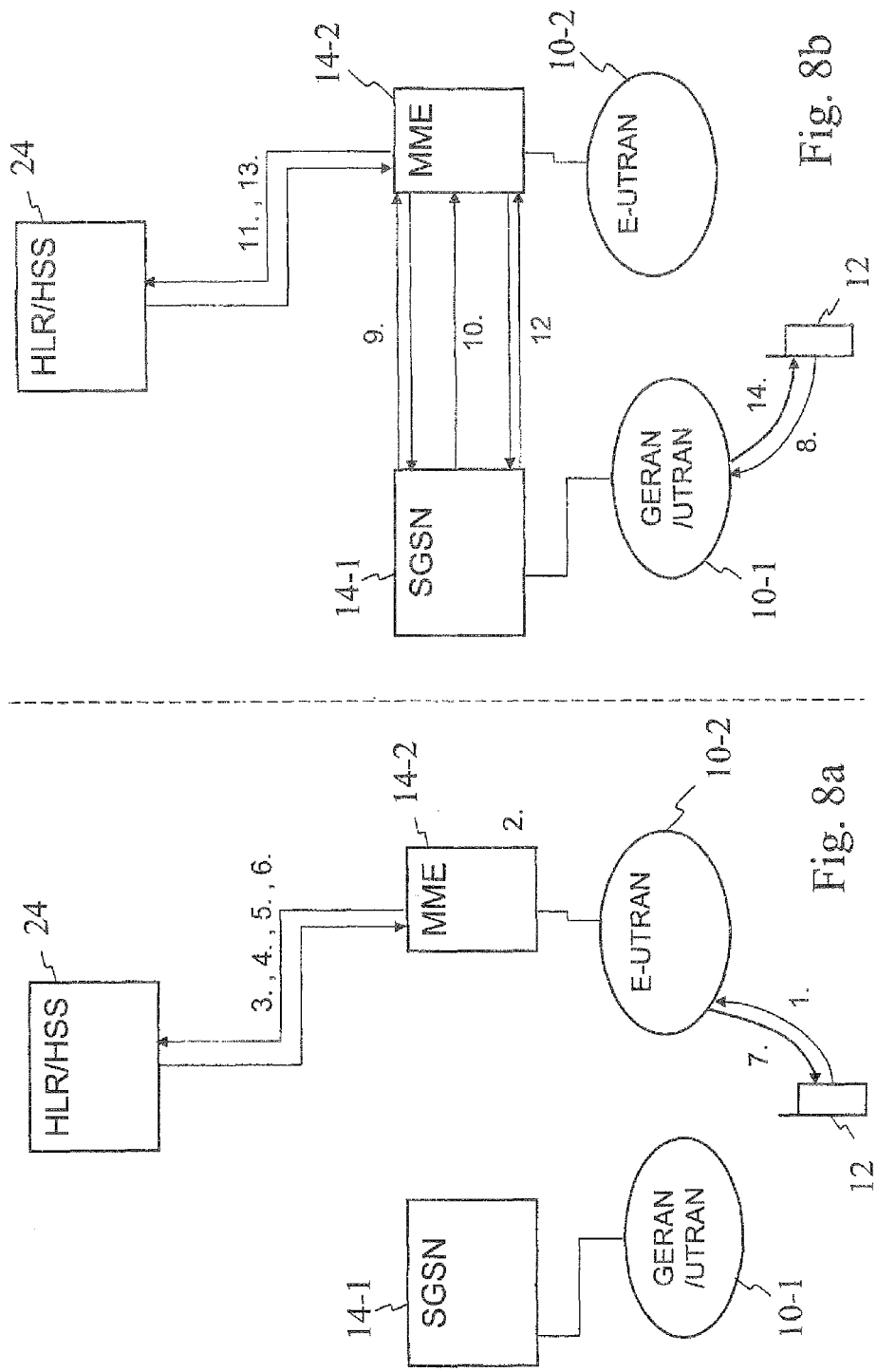

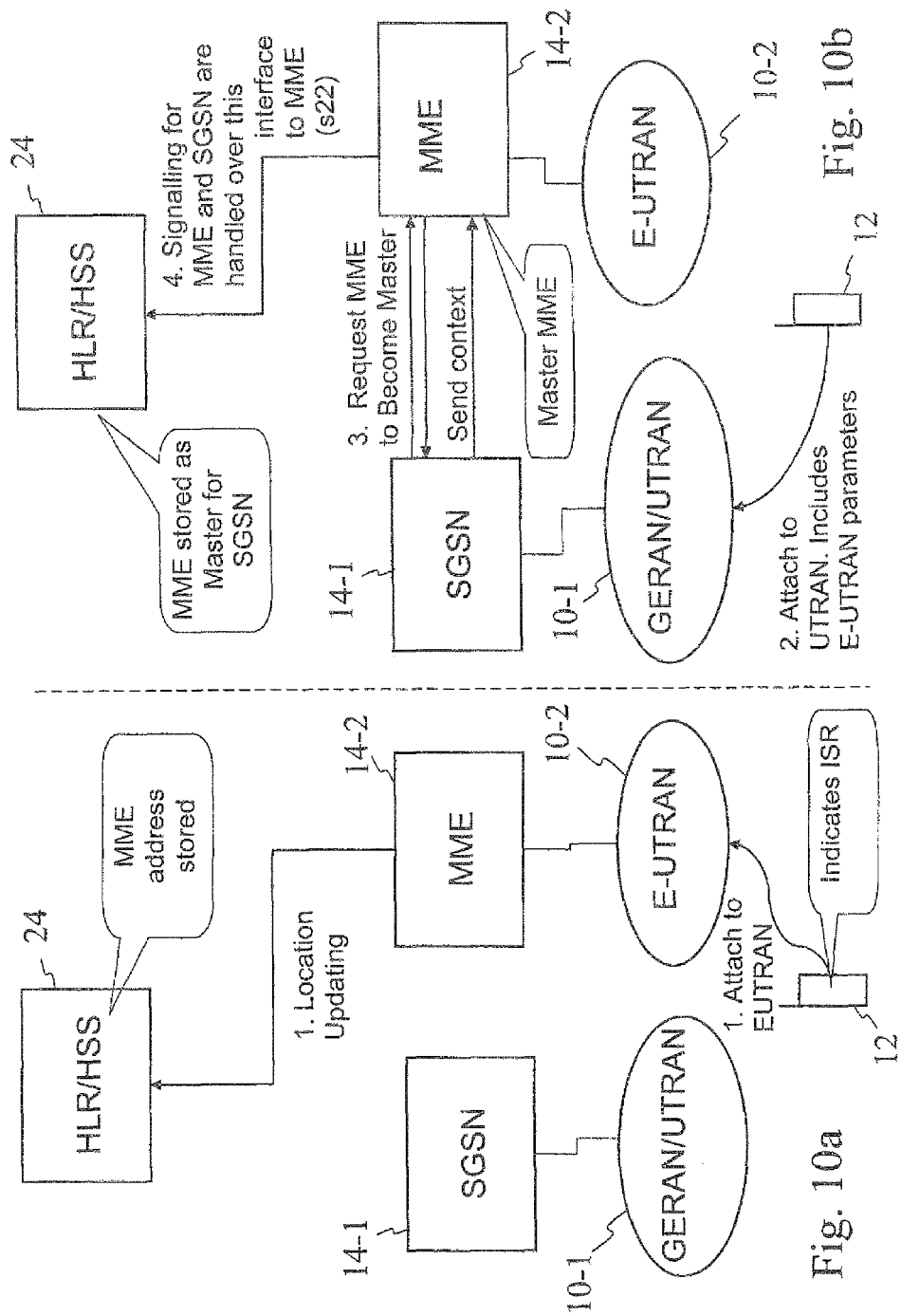

METHOD FOR CONTROLLING A COMMUNICATION NETWORK, SERVERS AND SYSTEM INCLUDING SERVERS, AND COMPUTER PROGRAMS

TECHNICAL FIELD

The present invention relates to a method for controlling a communication network, to servers configured to act as control plane serving entities for radio access networks (RANs), to systems including such servers, and to computer programs to be executed on the servers. The method, servers, systems and computer programs may notably be used for controlling a communication network in which a user equipment (UE) can simultaneously be registered in two or more distinct RANs.

BACKGROUND

In communication networks, such as telecommunication networks, distinct RANs may coexist within a given geographical environment. In particular, RANs based on distinct technologies may coexist within a given geographical environment. The simultaneous deployment of distinct RAN technologies may result from competition between radio access providers, from the intentional provision of complementary technologies, or from a transitional situation between different technologies or generations of technologies.

In the context of call control for instance, a call often involves, on the one hand, a control plane or signalling plane and, on the other hand, a user plane. The control plane or signalling plane is in charge of establishing and managing a connection between two points on the network, in charge of updating the location where a UE is, and so on. The user plane is in charge of transporting the user data, on wire or over the air.

When distinct RAN technologies are available in a given environment, a UE may simultaneously be registered in two or more of these available distinct RANs. Additional control plane signalling is however often needed to manage such configuration, in turn leading to an increase in the computing capacity required on the network nodes or servers in the control plane, also called serving entities.

It is desirable to provide methods, servers and computer programs which notably solve or partially solve the above-mentioned problems of better managing control plane signalling.

SUMMARY

Such methods and servers are defined in the independent claims. Advantageous embodiments are defined in the dependent claims.

In one embodiment, the method is for operating a communication network. The communication network includes at least two radio access networks (RANs) in which a user equipment (UE) can simultaneously be registered. The communication network further includes, for each of the at least two radio access networks, a serving entity in the control plane. The method includes the steps of assigning a master role to one serving entity and a slave role to the other serving entity or entities; and, when a serving entity to which a slave role is assigned has to perform control plane signalling, transmitting, by the serving entity, a signalling message to the serving entity to which the master role is assigned, so as to perform the control plane signalling.

In this embodiment, a serving entity to which the master role is assigned, also called herein master control plane serving entity or simply master serving entity, is used for handling the control plane signalling, such as core network signalling, when the UE is registered simultaneously in two or more RANs. This may for instance happen when the UE is attached simultaneously to a universal terrestrial radio access network (UTRAN) and an evolved universal terrestrial radio access network (E-UTRAN), which constitute two RANs based on distinct technologies. The assignment of a master role to a serving entity achieves control plane signalling reduction, such as core network signalling reduction. This also improves the control plane management synchronisation between control plane serving entities, and leads a reduction on the latency upon handover, as will be more fully apparent when reading the detailed description.

Furthermore, if the control plane signalling to be performed involves communication between serving entities and external network nodes, such a home subscriber system (HSS) or home location register (HLR), the provision of a master serving entity may partially or completely alleviate the need for interfacing the external network nodes and the serving entities to which a slave role is assigned, also called herein slave control plane serving entity or simply slave serving entity.

The invention is not limited to simultaneous UE registration to UTRAN and E-UTRAN. It also applies to a US simultaneously registered in different RANs whether those are 3GPP RANs, non-3GPP RANs, or a mixture of both. Allowing a UE to be simultaneously registered in more than one RAN type achieves signalling reduction, and increases handover speeds. However, the control plane signalling then involves different control plane serving entities. The invention provides a mechanism including a master serving entity, which, by acting as control plane signalling proxy for slave serving entities, improves the overall control plane management.

A communication network may herein be any network used for data communication, such as a core network within a mobile communication network, or a fixed telephony communication network. In one embodiment, the communication network is any one of a circuit-switched core network, a packet-switched core network, a circuit-switched core network for asynchronous transfer mode (ATM) and/or internet protocol (IP) transport, a circuit-switched core network in a Global System for Mobile communications (GSM) and/or Universal Mobile Telecommunications System (UMTS) environment, and a packet-switch network.

The signalling or control plane is a protocol or set of protocols and mechanisms, and by extension the network nodes implementing these mechanisms, for setting up and managing a connection, such as for instance for providing mobility management.

The user plane is a protocol or a set of protocols and mechanisms, and by extension the network nodes implementing these mechanisms, for transporting the user data. In one embodiment, the user plane implements the bearer functionality, such as for instance for providing the bearer control and transmission resources functions.

The user equipment (UE) is a communication device such as, but not limited to, a mobile phone, a personal digital assistant, a wireless laptop computer, or the like.

A UE is said to be registered in a RAN if signalling has been performed to enable its identity and location to be known by the RAN. This may include insertion of RAN-specific subscription-related information (user profiles) into a subscription database, insertion of user authentication and authorization information into a dedicated authentication and authorization database, and insertion of user's physical location into a location register database.

A UE is said to be attached in, or attached to, a RAN if a communication between the network and the UE is active through the RAN.

In one embodiment, the serving entity is a computer server within the communication network. In one embodiment, assigning a role to a serving entity involves instructing the serving entity to operate in a manner conforming to the behaviour expected from the role. This may involve setting a flag in the serving entity configuration or the like.

In one embodiment, assigning master and slave roles is performed on a per-user-equipment basis. That is, a serving entity may be assigned a master role for a first UE, while it is assigned a slave role for a second UE. This increases the flexibility of the system, and enables fine-grained network management.

In one embodiment, the communication network further includes a server including location information about the user equipment. In this embodiment, the control plane signalling that has to be performed includes interacting with the server. Herein, interacting with the database includes for instance querying, updating and the like.

This embodiment enables optimizations by the master serving entity. The master serving entity acts as relay function towards the server including location information about the UEs. It gets information that would otherwise only be obtained by the slave serving entity directly communicating with the server including location information about the UEs. The master serving entity may further be optimized in the sense that, with its master role, it may implement an even more active role than simply relaying information. For instance, the master serving entity may be used to proactively reserve resources.

In one embodiment, assigning the master role is based on the type of technology of the radio access network associated with each serving entity. This enables a simple implementation with preconfigured roles.

In this embodiment, the master role may for instance be assigned to a mobility management entity (MME), while the slave role may be assigned to a serving GPRS (General Packet Radio Service) support node (SGSN). The MME is associated with E-UTRAN, while the SGSN is associated with UTRAN. In this case, it may be possible to deploy networks with a HSS or HLR without requiring the activation of Signaling System #7 (SS7) (which is used on the interface the SGSN and HSS or HLR). Indeed, all signalling traffic may go through the MME and the S6a interface (the S6a interface, or S6a reference point, enables transfer of subscription and authentication data for authenticating/authorizing user access to the evolved system (AAA interface) between MME and HSS). This also reduces the risk of loss of synchronization between different serving entities simultaneously registered towards the HSS or HLR. It is thus possible to reduce or eliminate the SS7 traffic from either the circuit switched (CS) or the packet switched (PS) domains towards the HLR, by relaying it via the other domain.

In one embodiment, assigning the master role is based on the chronological order in which the user equipment accesses the radio access networks associated with the serving entities. By not, or not only, tying the assignment of master roles to a particular RAN technology, and by instead making the assignment of the master roles dependent on the access order to the RANs, unnecessary use of proxy master serving entities may be avoided, especially upon first attach by a UE to a RAN.

In one embodiment, assigning the master role is based on the chronological order in which the user equipment accesses the radio access networks associated with the serving entities, and the method, further includes, after the assigning step, the steps of detecting that the user equipment accesses another radio access network, deciding whether to transfer the master role based on the type of technology of this other radio access network, and, if the result of the deciding step is positive, transferring the master role to the serving entity of this other radio access network.

In one embodiment, before the detecting step, information identifying the radio access network or networks to which the user equipment is already registered is transmitted by the user equipment when accessing the other radio access network.

The invention further relates, in one embodiment, to a server configured to act as a serving entity in the control plane for a radio access network and configured to be capable of being assigned a slave role. When the slave role is assigned to the server and when the server has to perform control plane signalling, the server is configured to transmit, to another server which acts as a serving entity in the control plane for another radio access network and to which a master role is assigned, a signalling message, so as to perform the control plane signalling.

The invention further relates, in one embodiment, to a server configured to act as a serving entity in the control plane for a radio access network and configured to be capable of being assigned a master role. When the master role is assigned to the server, the server is configured to accept and process a signalling message from another server which acts as a serving entity in the control plane for another radio access network and to which a slave role is assigned, so as to perform control plane signalling.

The invention further relates, in one embodiment, to a server configured to act as a serving entity in the control plane for a radio access network and configured to be capable of being assigned a master role or a slave role. When the slave role is assigned to the server and when the server has to perform control plane signalling, the server is configured to transmit, to another server which acts as a serving entity in the control plane for another radio access network and to which a master role is assigned, a signalling message, so as to perform the control plane signalling. In contrast, when the master role is assigned to the server, the server is configured to accept and process a signalling message from another server which acts as a serving entity in the control plane for another radio access network and to which a slave role is assigned, so as to perform control plane signalling.

In one embodiment of any one of the above-mentioned servers, the control plane signalling to be performed includes interacting with a server including location information about the user equipment.

The invention further relates, in one embodiment, to a system including at least two servers capable of being assigned a master role or a slave role, as described above. The servers are such that a user equipment can simultaneously be registered in the radio access networks for which the at least two servers are configured to act as serving entity. The system is configured so that the master role is assigned to one of the at least two servers based on the type of technology of the radio access networks for which the servers are configured to act as serving entity.

The invention further relates, in one embodiment, to a system including at least two servers capable of being assigned a master role or a slave role, as described above. The servers are such that a user equipment can simultaneously be registered in the radio access networks for which the at least two servers are configured to act as serving entity. In this embodiment, the system is configured so that the master role is assigned to one of the at least two servers based on the chronological order in which the user equipment accesses the radio access networks for which the servers are configured to act as serving entity.

In one embodiment, the system is further configured for detecting that the user equipment accesses another radio access network, deciding whether to transfer the master role based on the type of technology of this other radio access network, and, if the result of the deciding step is positive, transferring the master role to the serving entity of this other radio access network.

In one embodiment, before the detecting step, information identifying the radio access network or networks to which the user equipment is already registered is transmitted by the user equipment when accessing the other radio access network.

The invention further relates, in one embodiment, to computer programs including instructions configured, when executed on one of the above-described servers, to cause the server to operate according to its above-described configuration.

BRIEF DESCRIPTION OF THE DRAWINGS

Embodiments of the present invention shall now be described, in conjunction with the appended figures, in which:

FIGS. 8a and 8b schematically illustrate a second aspect of the first scenario, in one embodiment of the invention, wherein a master/slave interaction occurs with the preconfigured slave and master roles, and wherein the UE first attaches on the E-UTRAN network;

FIGS. 9a, 9b, 10a and 10b illustrate a second scenario, in one embodiment of the invention, with a slave master negotiation (i.e. no preconfigured master and slave roles)

DETAILED DESCRIPTION

The present invention shall now be described in conjunction with specific embodiments. It may be noted that these specific embodiments serve to provide the skilled person with a better understanding, but are not intended to in any way restrict the scope of the invention, which is defined by the appended claims.

Figure 1:
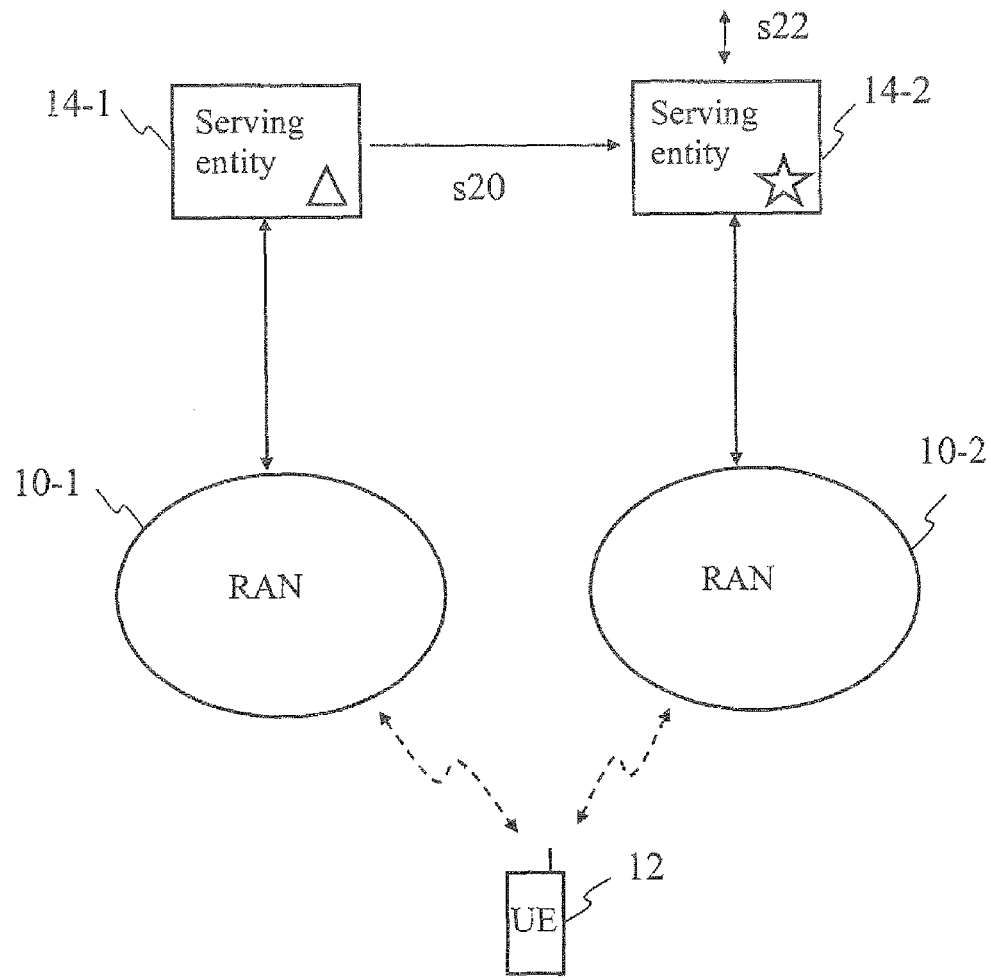
FIGS. 1 and 2 schematically illustrate network configurations in two embodiments of the invention, respectively.

FIG. 1 schematically illustrates a network configuration in one embodiment of the invention. A UE 12 is capable of accessing both the RAN 10-1 and the RAN 10-2. For each RAN 10-1, 10-2, a corresponding serving entity 14-1, 14-2 is provided in the control plane.

One of the serving entities in the control plane is assigned a master role, while the other serving entities in the control plane are each assigned a slave role. Although one slave serving entity is illustrated in FIG. 1, there may be more than one slave serving entity. In FIG. 1, the star sign indicates that the master role is assigned to the serving entity 14-2. The triangle sign indicates that a slave role is assigned to the serving entity 14-1.

When the UE 12 communicates or wants to communicate through the RAN 10-1, the serving entity 14-1 serving the RAN 10-1 may be required to perform control plane signalling. If so, the slave serving entity 14-1 transmits s20 a signalling message to the master serving entity 14-2. As a result, the serving entity 14-2 carries out the necessary processing to complete the control plane signalling required by the serving entity 14-1. For instance, the serving entity 14-2 interacts s22 with other network nodes to perform the control plane signalling.

Figure 2:
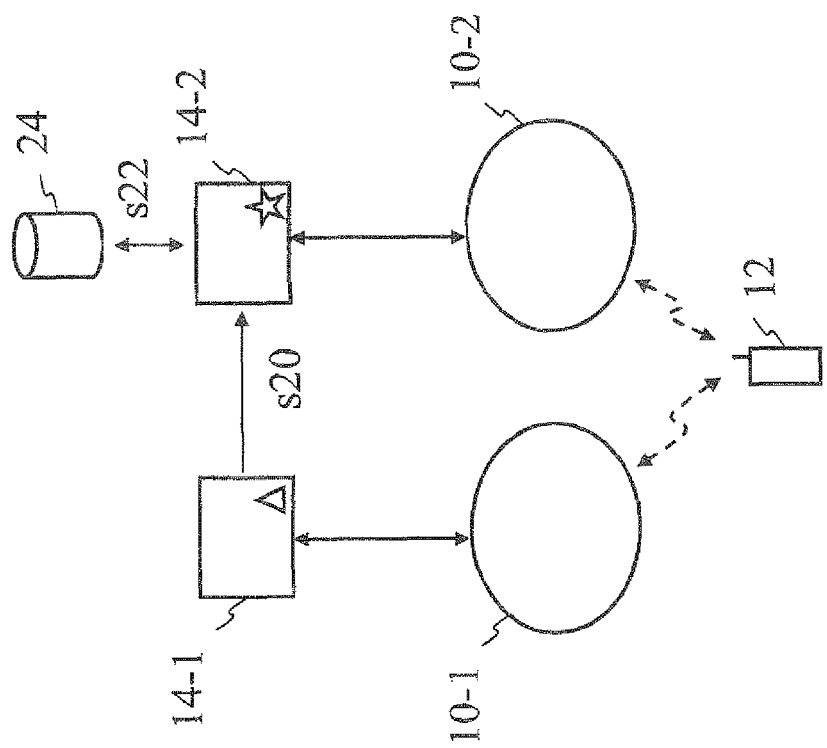

FIG. 2 schematically illustrates a network configuration in one embodiment of the invention, wherein, in comparison to the embodiment illustrated in FIG. 1, the master serving entity 14-2 is shown to interact s22 with a database 24 in order to perform the control plane signalling for, i.e. on the behalf of, the slave serving entity 14-1. The database 24 may include location information about the UE 12.

In FIGS. 1 and 2, the dotted arrows from the UE 12 to the RANs 10-1, 10-2, indicate that the UE 12 may be simultaneously registered in two RANs. In one embodiment, the UE 12 is capable of being simultaneously registered in both RANs, but is incapable of communicating simultaneously to both RANs. In another embodiment, the UE 12 is capable of being simultaneously registered in both RANs and is capable of communicating simultaneously to both RANs.

The two RANs may for instance be UTRAN and E-UTRAN, and the simultaneous registration to both RANs may for instance occur in the following case. When the idle-mode signalling reduction (ISR) is active (see 3GPP TS 23.401: "General Packet Radio Service (GPRS) enhancements for Evolved Universal Terrestrial Radio Access Network (E-UTRAN) access" (Release 8) v8.0.0 (here referred to as "reference [1]"), Annex J), a simultaneous registration to the two RANs 10-1, 10-2 takes place. The assignment of a master role to a control plane serving entity achieves control plane signalling reduction, such as core network signalling reduction, thus increasing the overall signalling reduction achieved by the ISR mode.

Figure 3:
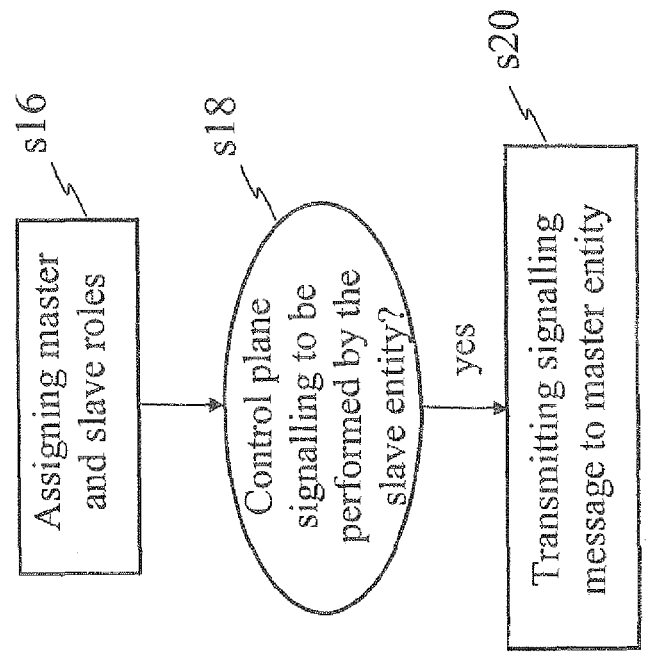
FIG. 3 is a flowchart illustrating steps carried out in a method of one embodiment of the invention.

FIG. 3 schematically illustrates steps of a method in one embodiment of the invention. After the master and slave roles have been assigned s16 to the control plane serving entities, if control plane signalling has to be performed by a slave serving entity (step s18, "yes"), a signalling message is transmitted s20 to the master serving entity.

Figure 4:
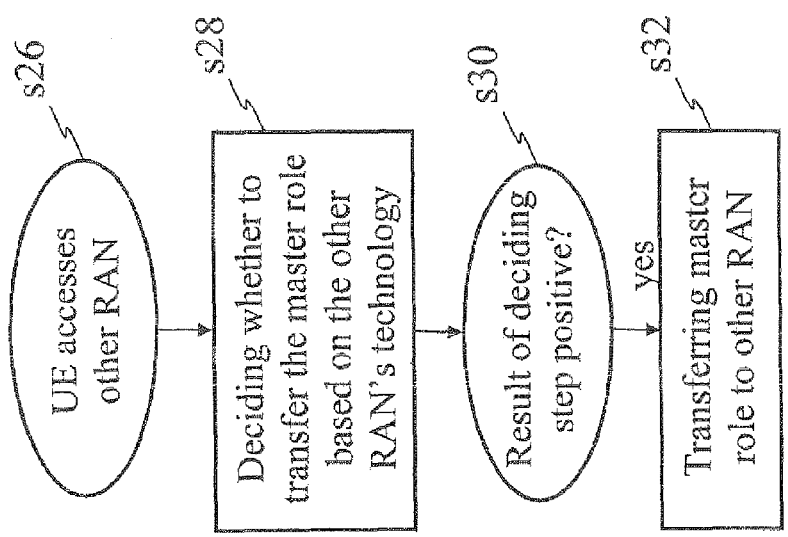
FIG. 4 is a flowchart illustrating steps leading to the transfer of a master role in a method of one embodiment of the invention.

FIG. 4 schematically illustrates steps in a method of one embodiment of the invention. In particular, steps leading to the transfer of a master role to another RAN are depicted.

After the master and slave roles have been assigned s16 (not illustrated in FIG. 4, but necessary precondition before the steps of FIG. 4 can be carried out), the UE accesses s26 another RAN. This may be triggered for instance by the detection by the UE of another RAN, which is available in the geographical area of the UE. It is then decided s28 whether to transfer the master role, based on the technology of the new RAN. In one embodiment, when a UE is registered in two RANs, including a UTRAN and a E-UTRAN, the master role is assigned by default to the serving entity associated with the E-UTRAN.

If the result of the deciding step is positive s30, in other words if the master role has to be assigned to the new RAN, the master role is transferred s32 to the other RAN.

Figure 5:
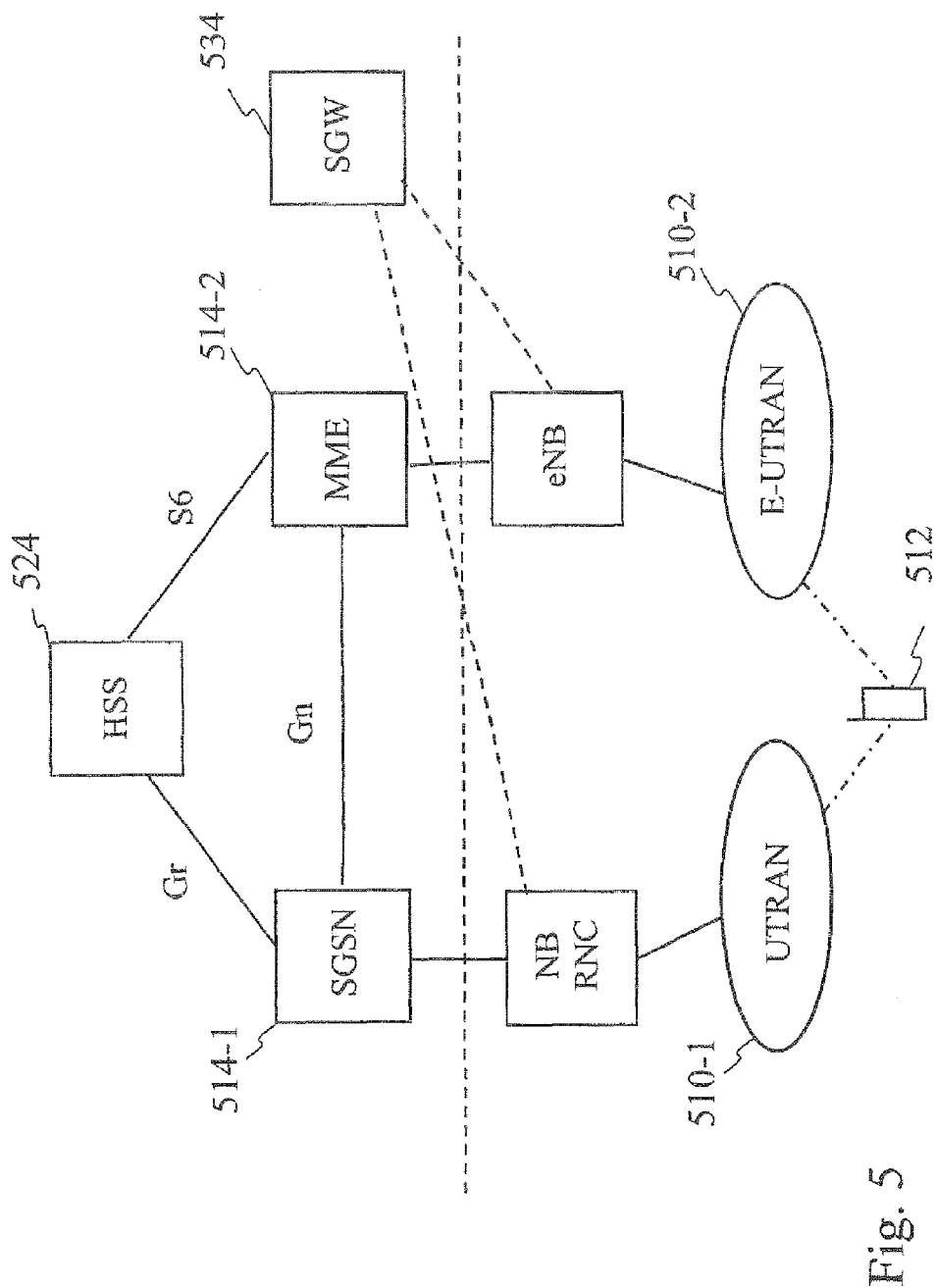
FIGS. 5 and 6 illustrate respectively a network configuration and steps performed in an exemplary scenario to assist understanding the problems addressed by the invention.
Figure 6:
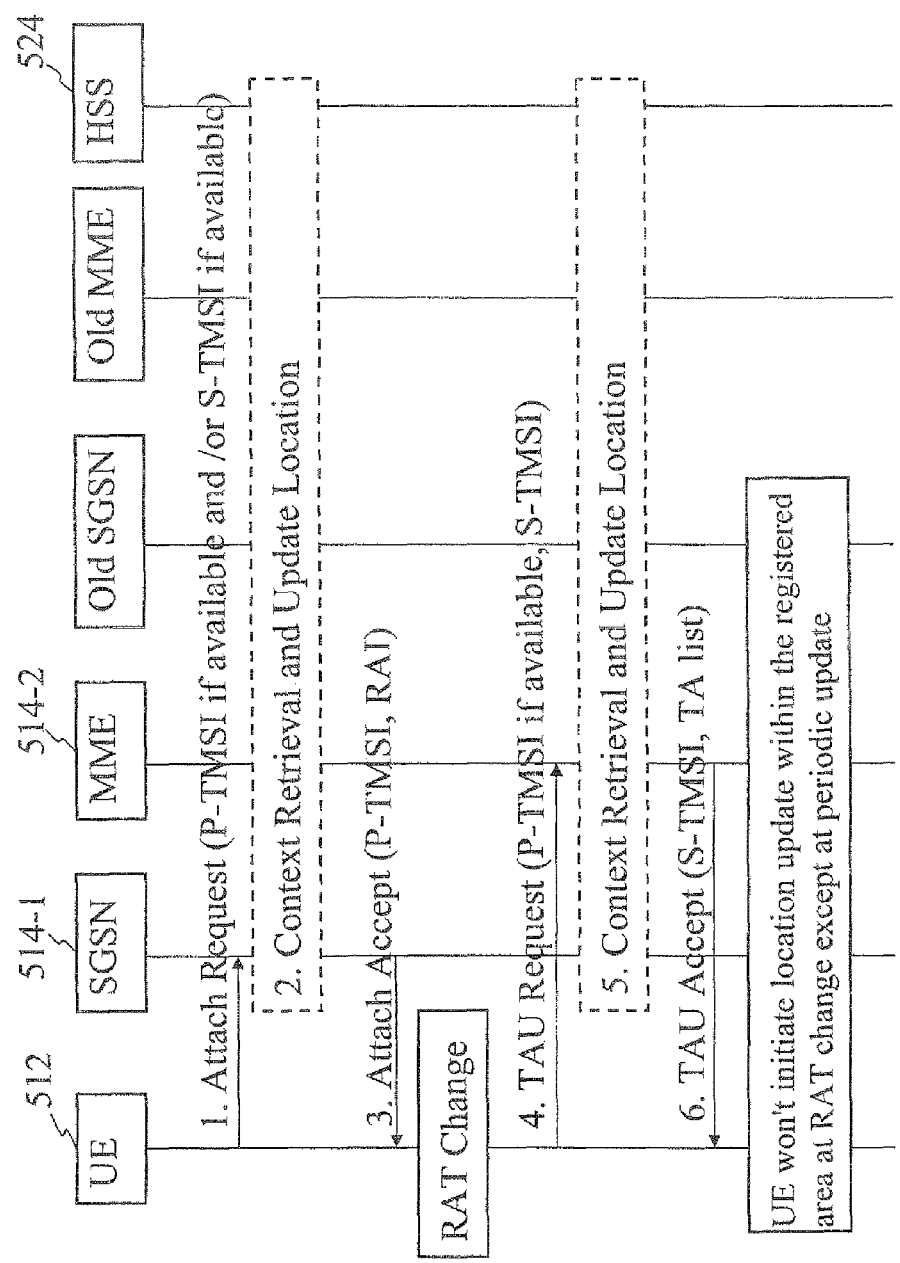

FIGS. 5 and 6 schematically illustrate an exemplary scenario to help understanding the problems addressed by the invention.

3GPP has introduced the concept of idle-mode signalling reduction (ISR) in evolved packet system (EPS) (see reference [1], Annex J) in order to reduce mobility related signalling during inter radio access technologies (inter-RAT) cell-reselection in LTE idle state. ISR limits the signalling at radio level upon simultaneous registration in both UTRAN (reference "510-1" in FIG. 5) and E-UTRAN (reference "510-2" in FIG. 5) networks while considering the resulting trade-off between paging and paging area vs. location updating.

FIG. 5 shows the functions involved in core signalling upon using the ISR mode.

Both the serving GPRS (General Packet Radio Service) support node (SGSN) 514-1 and mobility management entity (MME) 514-2 nodes keep track of the user data and location on the corresponding access, In other words, the UE 512 is independently registered at both the UTRAN/GERAN 514-1 and E-UTRAN 514-2 access networks (wherein. GERAN stands for GSM EDGE—i.e. enhanced data rates for GSM evolution—radio access network). The home subscriber server (HSS) 524 is aware of this simultaneous registration and updates both the SGSN 514-1 and the MME 514-2 with the corresponding user data by using the Gr interface (towards the SGSN 514-1, as illustrated) and the S6a interface (towards the MME 514-2, as illustrated).

The ISR mode may be active in the UE 512 when the UE 512, the HSS 524, the serving gateway (SGW) 534, the MME 514-2 and the SGSN 514-1 support the ISR functionality. The ISR-activated UE 512 sets internally a flag or field "ISR synch required" if there is a bearer change in the currently used radio access technology (RAT).

When ISR is used and the UE 512 indicates "ISR synch required" at change to another RAT, it causes a context update at the core network node in the new RAT.

When an ISR-activated UE 512 moves from the UTRAN registration area paging channel (URA PCH) 510-1 into E-UTRAN 510-2, it initiates an update. If there is no "ISR synch required", the "Update Type" is set to "URA PCH handling"; otherwise the "Update Type" is "ISR synch".

In other cases (i.e. no ISR synch and no URA_PCH handling), the UE 512 initiates an update with "Update Type" as "RA updating" or "TA updating" when moving out of the registered area; and the UE 512 initiates an update with "Update Type" as "periodic updating" when the current RAT periodic timer expires or when the UE 512 changes the RAT and it memorises that the current RAT periodic timer expired when the UE 512 camped on the other RAT.

The example illustrated on FIG. 6 shows a possible behaviour induced by using of the ISR mode in a communication network.

During the steps labelled 1 to 3, i.e.
  "1, Attach Request (P-TMST if available and/or S-TMST if available)" from UE 512 to SGSN 514-1, wherein P-TMSI stands for "packet temporary mobile subscriber identity" and wherein S-TMST is similar to the P-TMSI in the evolved architecture (EPS),
  "2, Context Retrieval and Update Location", and
  "3. Attach Accept (P-TMST, RAI)", from SGSN 514-1 to UE 512, wherein RAI stands for "routing area identity", the UE 512 performs an attach in UTRAN 510-1, performing a location updating in the HSS 524 if it has not done it before for storing the SGSN 514-1 address.

The UE 512 then moves to E-UTRAN 510-2 (box labelled "RAT Change", wherein RAT stands for radio access technology).

During the steps labelled 4 to 6, i.e.
  "4. TAU Request (P-TMST if available, S-TMSI)", wherein TAU stands for tracking area update,
  "5, Context Retrieval and Update Location", and
  "6. TAU Accept (S-TMST, TA list)", the UE 512 performs a TAU procedure, performing a location updating in the HSS 524 if it has not done it before for storing the MME 514-2 address.

As it can be seen, the HSS 524 has not sent a "Cancel location" towards the SGSN 514-1, so that at this moment the user is registered in both networks 510-1, 510-2. This "Cancel location" has not been sent because the MME 514-2 and the SGSN 514-1 are both aware of the ISR mode support. For getting this knowledge upon attaching to a network, the UE 512 sends the identity of the cell where it is located. Thus, the MME 514-2 and SGSN 514-1 can dynamically find the previous node that was serving the UE 512 and can ask it whether it supports ISR. If the previous node does not support ISR upon performing their corresponding location, the requesting node indicates the HSS 524 not to generate such "Cancel location" (in the example illustrated in FIGS. 5 and 6 both SGSN 514-1 and MME 514-2 support ISR). More information about the ISR behaviour can be found in reference [1].

From the exemplary scenarios illustrated in FIGS. 5 and 6, it can be seen that the TSR solution focuses on the limitation of the "on the air" signalling in EPS but maintains current signalling over core network legacy interfaces. This may lead, first, to an overall increase in core network signalling because the UE 512 is simultaneously registered in two different RANs 510-1, 510-2. This decreases the resource efficiency achieved by the ISR mode over the RANs. Secondly, synchronization problems between different control plane serving entities (i.e. SGSN 514-1 and MME 514-2) may occur because the UE 512 is 3GPP registered but the core network simultaneously maintains two instances of the UE context in the serving entities. When the ISR mode is ended, one of the instances continues to be used. Thirdly, this may also lead to unpredictable behaviour of events that may occur at the user plane level (e.g. bearer, PDN connection, PDP context, data tunnel, etc) because two control plane serving entities are serving the same UE 512. It also keeps the signalling in the core network for both UTRAN and E-UTRAN levels.

The above problems may occur when a UE is registered simultaneously in two RANs operating using distinct RAN technologies, and is not limited to 3GPP RAN technologies. For instance, it may be possible for a UE to be registered in WiMAX and LTE simultaneously or in I-WLAN or in WiMAX and so on. This could be to also save idle mode signalling across different RANs as well as to allow a UE to be pre-registered in different RANs to reduce handover latency. In this case, similar core network signalling problems as those described with reference to the use of the ISR mode arise when a UE is registered in UTRAN and E-UTRAN simultaneously.

Now referring to FIGS. 7 to 11, embodiments of the invention will be described in more details, notably in the form of scenarios. Through these embodiments, the selection of a control plane serving entity as master serving entity and the signalling interaction with its corresponding slave serving entity or entities will be highlighted.

When a MME 14-2 is selected as master serving entity for the handling of control plane signalling in a packet data network, the expression "master MME" is used to denote such MME. The invention is not limited to this case however. It is also possible to define a "master SGSN", a "master Mobility Access Gateway", a "master CDMA2000 control plane entity" (e.g. master eAN/PCF), a "master ePDG" for I-WLAN networks or a "master AAA", etc.

In one embodiment, the UE 12 indicates on the attach to both UTRAN 10-1 and E-UTRAN 10-2 networks that it supports simultaneous attach in both networks, such as the ISR mode.

In one embodiment, a MME 14-2 and a SGSN 14-1 interact with each other. A master MME 14-2 may be regarded as a relay function from the perspective of a HSS 24 throughout the duration of the relationship between the master MME 14-2 and the SGSN 14-1. However, from the perspective of the slave-SGSN 14-1, the master MME 14-2 may be regarded as a master serving entity.

For the sake of the simplicity, only the interfaces towards and from the core EPS networks are shown in FIGS. 7 to 11. Depending on how the first attach is performed and on whether there is negotiation on the assignation of the master role, the following scenarios may occur.

A first scenario relates to a master-slave interaction on attach in 3GPP networks wherein the slave and master roles for the control plane serving entities are assigned based on the RAN technology. The variants (or aspects) of the first scenario are schematically illustrated in FIG. 7 (first attach to GERAN/UTRAN network 10-1) and in FIGS. 8*a*, 8*b* (first attach to E-UTRAN network 10-2) respectively.

Figure 7:
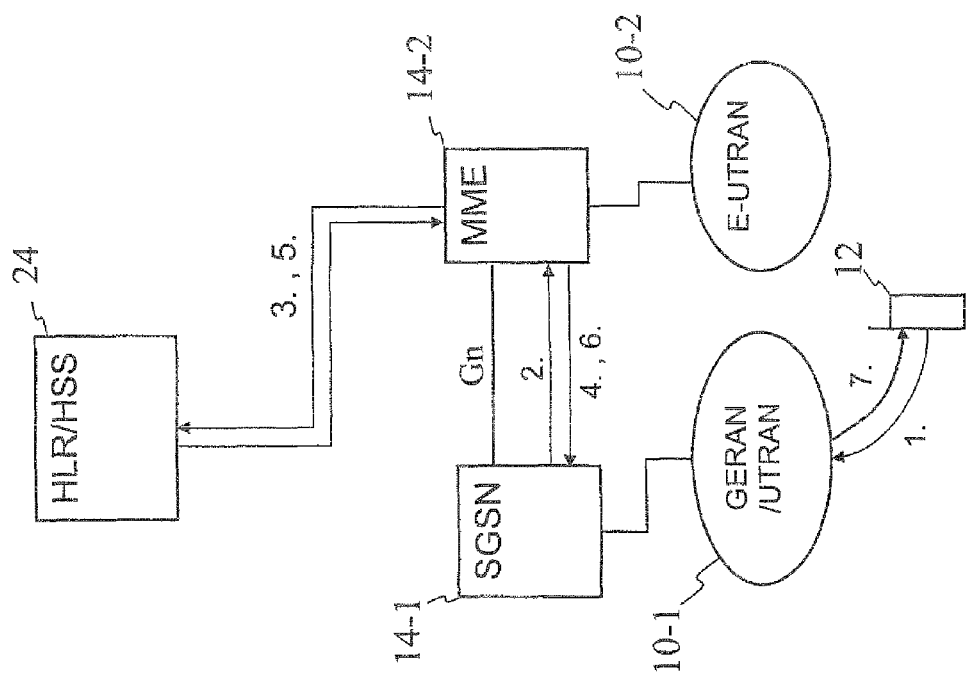
FIG. 7 schematically illustrates a first aspect of a first scenario, i.e. a method, in one embodiment of the invention, where a master/slave interaction occurs with preconfigured slave and master roles, and wherein the UE first attaches on the GERAN/UTRAN network.

Referring to FIG. 7, a UE 12 first attaches on the GERAN/UTRAN network 10-1 (illustrated on FIG. 7) and later also moves to E-UTRAN 10-2 (not illustrated on FIG. 7).

(Step 1). The UE 12 performs a GPRS attach request in GERAN/UTRAN 12 in order to obtain access to the GPRS services. If this is an initial attach, the UE 12 provides the SGSN 14-1 with its international mobile subscriber identity (IMSI) and an indication that the UE 12 supports the ISR mode.

(Step 2). Since the UE 12 has indicated that it supports simultaneous registration in both UTRAN 10-1 and E-UTRAN 10-2 radio networks, the SGSN 14-1 contacts the corresponding mated MME 14-2 to be used as master MME and requests it via the Gn interface to perform to register the UE 12 in both UTRAN 10-1 and E-UTRAN 10-2 networks.

Upon attaching, the UE 12 registers at the SGSN 14-1 and MME 14-2, When the UE 12 then appears at the other radio access network, it performs a registration area update (RAU) or a tracking area update (TAU).

Alternatively, the master-slave relationship may be altered not to bind the master role to either one of the serving entities 14-1, 14-2, but instead may depend on the RAN to which the UE 12 first attaches, i.e. on the chronological order according to which the UE 12 accesses the RANE. This requires a proxy functionality at both SGSN 14-1 and MME 14-2. That is, both serving entities 14-1, 14-2 need to be configured so that they are both capable of being assigned a master role.

(Step 3). The master MME 14-2 performs the authentication mechanism towards the HSS 24 on behalf of the SGSN 14-1. In other words, it request authentication vectors to be used in the UTRAN network (At this stage, it may leave the request of authentication vectors for the E-UTRAN network 10-2 for later request, upon real handover to the E-UTRAN network 10-2 in order to ensure that the provided authentication vectors do not become stale). The master MME 14-2 is then perceived as an SGSN proxy by the HSS 24.

(Step 4). The MME 14-2 sends the authentication vectors to the SGSN 14-1. The SGSN 14-1 then performs authentication and, if valid, the SGSN 14-1 asks the MME 14-2 to confirm it and perform a location updating. A P-TMSI is assigned by the SGSN 14-1 to the UE 12. The MME 14-2 may also assign a temporary non-trusted "dummy" S-TMSI, so that the UE 12 may indicate its assigned master MME 14-2.

(Step 5). The master MME 14-2 performs an "Update Location" towards the HSS 24 indicating that the HSS 24 has to store both SGSN 14-1 and MME 14-2 addresses. The master MME 14-2 also asks the HSS 24 to send all the packet data for both packet core networks (the GPRS or UMTS core network, and the EPS network) to the master MME 14-2.

(Step 6). Once the HSS 24 has sent to the MME 14-2 all the packet data, the MME 14-2 stores the data and the MME 14-2 sends the data corresponding to the UTRAN access to the SGSN 14-1 (all the packet data is stored in order to not to fetch it from the HSS 24 upon subsequent inter-SGSN handover; should any subscription data not be valid in the target serving entity then either an error is sent or specific request to HSS 24 is performed to fetch correct data).

(Step 7). The "Update Location" is acknowledged and the attach is accepted. As a result, the UE 12 has available a P-TMSI, an S-TMSI and an indication that the ISR mode is active. Both SGSN 14-1 and MME 14-1 have their addresses stored in the HSS 24 and the user data they need fetched.

(Step 8—not illustrated in FIG. 7). If later, the RAN is changed to E-UTRAN 10-2, the S-TMSI may be used for locating the master MME 14-2.

FIGS. 8*a*, 8*b* illustrate the case wherein the initial attach is first performed in the E-UTRAN network 10-2 (second variant or aspect of the first scenario):

(Step 1). First referring to FIG. 8*a*, the UE 12 performs an E-UTRAN attach request to the MME 14-2 in order to obtain access to the UMTS or GPRS services. If this is an initial attach, the UE 12 provides the MME 14-2 with the IMSI and an indication that the UE 12 supports the ISR mode.

(Step 2). Since the UE 12 has indicated that it supports simultaneous attach to both UTRAN 10-1 and E-UTRAN 10-2, the MME 14-2 marks itself as "master MME" (i.e. assigns itself the master role) for possible later attaches to the UTRAN network 10-1.

(Step 3). The master MME 14-2 performs the authentication mechanism towards the HSS 24 (At this stage, it may leave the request of authentication vectors for the UTRAN network 10-1 for later request, upon real handover to the UTRAN network 10-1 in order to ensure that the provided authentication vectors do not become stale).

(Step 4). The master MME 14-2 performs authentication and, if valid, it assigns an S-TMSI.

(Step 5). The master MME 14-2 performs an "Update Location" towards the HSS 24 indicating that it has to store its address. The master MME 14-2 also asks to the HSS 24 to send all the packet data to the master MME 14-2.

(Step 6). When the HSS 24 sends to the MME 14-2 the packet data, the MME 14-2 stores it.

(Step 7). The "Update Location" is acknowledged and the attach is accepted. As a result, the UE 12 has available an S-TMSI.

(Step 8). Now turning to FIG. 8b, if the RAN is then changed to the UTRAN network 10-1, the UE 12 indicates to the SGSN 14-1 that it supports the ISR mode. Additionally, the UE 12 sends to the SGSN 14-1 the subscriber's temporary identity for EPC (e.g. a S-TMSI or a global unique temporary identity (GUTI)) that was assigned in the MME 14-2. This temporary identity for EPC enables the SGSN 14-1 to find the MME 14-2.

(Step 9). Upon context request to the MME 14-2, the MME 14-2 returns to the SGSN 14-1 an indication that the MME 14-2 has to be considered as master MME.

(Step 10). The SGSN 14-1 acknowledges the MME 14-2 as master and the SGSN 14-1 asks the MME 14-2 to perform authentication.

(Step 11). The MME 14-2 requests authentication vectors to the HSS 24 on behalf of the SGSN 14-1.

(Step 12), The MME 14-2 sends the authentication vectors to the SGSN 14-1, which performs authentication and, if valid, the SGSN 14-1 asks the MME 14-2 to confirm it and to perform a location updating. A P-TMSI is then assigned in the SGSN 14-1, to the UE 12.

(Step 13). The MME 14-2 performs an "Update Location" towards the HSS 24 indicating that the HSS 24 has to store both SGSN and MME addresses. This time, the "Insert Subscriber Data" message is not needed since the packet data is already available in the MME 14-2 and the MME 14-2 instructs the HSS 24 not to send the packet data.

(Step 14). The "Update Location" is acknowledged and the attach is accepted. As a result, the UE 12 has available a P-TMSI, an S-TMSI and an indication that the ISR mode is active. Both SGSN 14-1 and MME 14-2 have their addresses stored in the HSS 24 and the user data they need fetched.

Now turning to FIGS. 9a, 9b, 10a and 10b, a second scenario relates to a master-slave interaction on attach in 3GPP networks with a slave-master control plane serving entity negotiation. The relationship slave-master is negotiated between the serving entities 14-1, 14-2 when the UE 12 has attached to both RANs 10-1, 10-2. The second scenario differs from the first scenario described with reference to FIGS. 7, 8a and 8b, and introduces more flexibility.

Figure 9B:
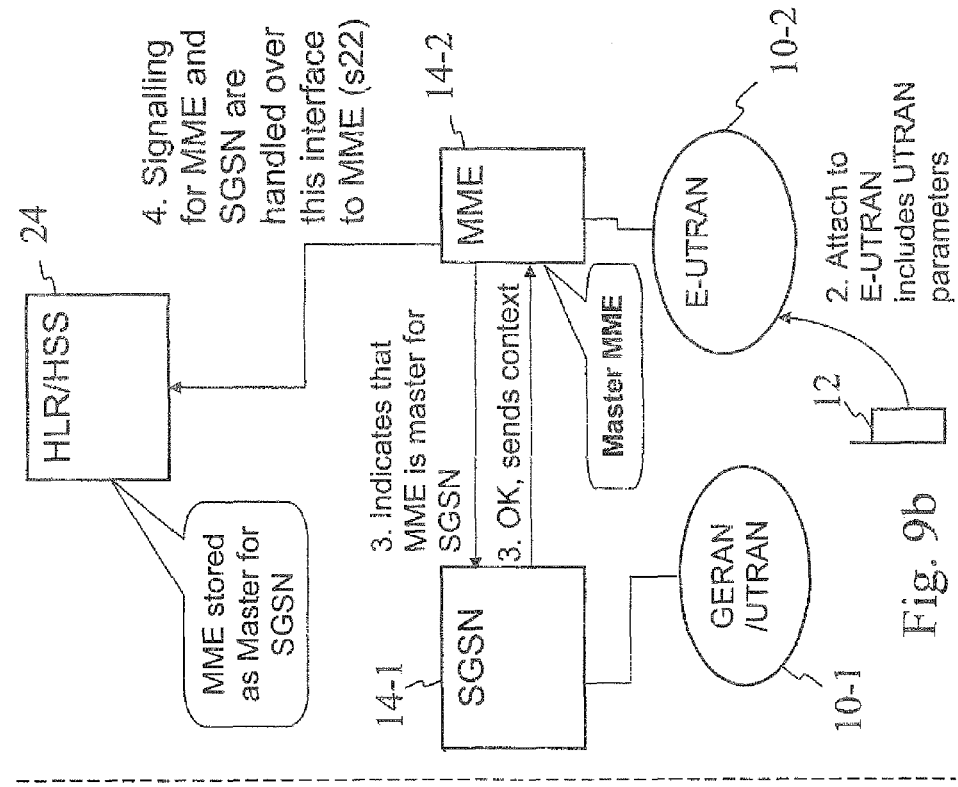
Figure 9A:
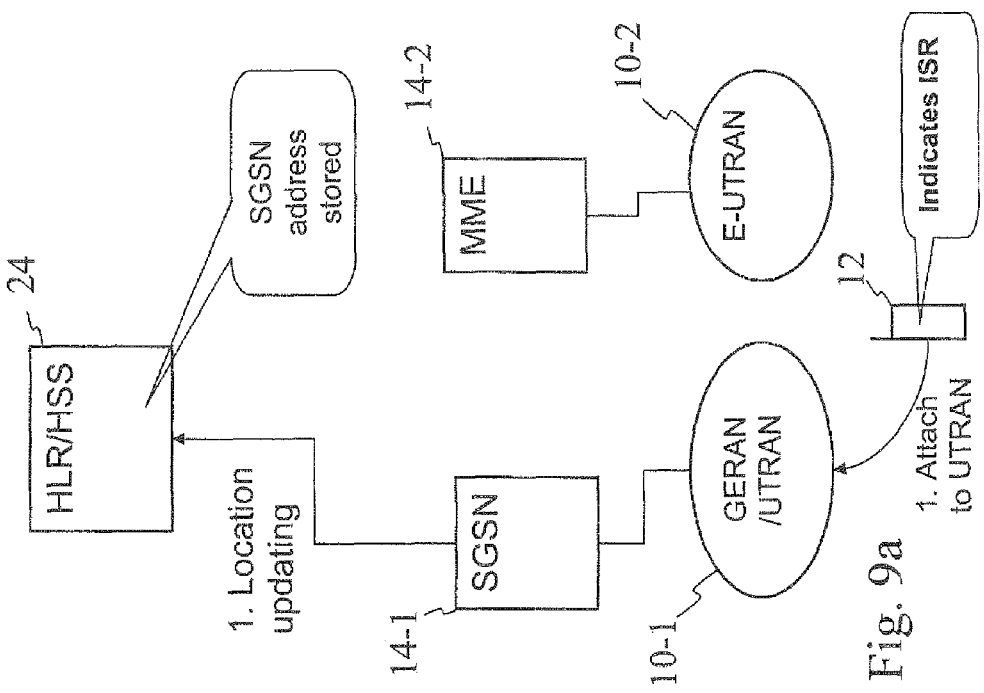

Referring to FIGS. 9a and 9b, if the UE 12 attaches first to GERAN/UTRAN 10-1 and then moves to E-UTRAN 10-2:

(Step 1). As illustrated on FIG. 9a, the UE 12 performs a normal attach to GERAN/UTRAN 10-1 and the UE 12 indicates support for the TSR mode. This implies that the SGSN 14-1 requests context from old SGSN or old MME, authenticates the UE 12, and performs "Location Updating" towards HLR/HSS 24. The UE 12 is registered in the HSS 24 as available at the SGSN address.

(Step 2). Now turning to FIG. 9b, when the UE 12 changes the RAN technology to E-UTRAN 10-2, it provides the MME 14-2 also with the IMSI, GPRS P-TMSI and the indication that the UE 12 supports the ISR mode.

(Step 3). The MME 14-2 then instructs the SGSN 14-1 that the MME 14-2 is taking on the master role. The SGSN 14-1 accepts and forwards all context data to the MME 14-2. The SGSN 14-1 will send/receive future HSS signalling via the MME 14-2.

(Step 4, s22). The MME 14-2 authenticates the UE 12 and sends an "Update Location" to the HSS 24 indicating that the UE 12 supports the ISR mode and that the MME 14-2 is assigned the master role for the currently assigned SGSN 14-1. The HSS 24 will send any message intended for the SGSN 14-1 to the MME 14-2.

Referring to FIGS. 10a and 10b, if the UE 12 attaches first to E-UTRAN 10-2 and then moves to GERAN/UTRAN 10-1:

(Step 1). As illustrated on FIG. 10a, the UE 12 performs normal attach to E-UTRAN 10-2 and it indicates support for the ISR mode. This implies that the MME 14-2 requests context from old MME or old SGSN, authenticates the UE 12, and performs "Location Updating" towards the HLR/HSS 24. The UE 12 is registered in the HSS 24 as available at the MME address.

(Step 2). Now turning to FIG. 10b, when the UE 12 attaches to GERAN/UTRAN 10-1, it provides the SGSN 14-1 also with the IMSI, LTE S-TMSI or GUTI and the indication that the UE 12 supports the ISR mode.

(Step 3). The SGSN 14-1 sends a request to the US's 12 assigned MME 14-2 (obtained from the S-TMSI or GUTI) requesting the MME 14-2 to take on the master role. If the MME 14-2 accepts, the SGSN 14-1 forwards all context data to the MME 14-2. The SGSN 14-1 will send/receive future HSS signalling via the MME 14-2.

(Step 4, s22). The MME 14-2 authenticates the UE 12 and sends an "Update Location" to the HSS 24 indicating that the UF 12 supports ISR and that the MME 14-2 is assigned a master role for the currently assigned SGSN 14-1. The HSS 24 will send any message intended for the SGSN 14-1 first to the MME 14-2.

In both cases of the second scenario (illustrated in FIGS. 9a, 9b, 10a, 10b), once the MME 14-2 is tagged as master in the HSS 24, all signalling data and parameters needed by the UE 12 in GERAN/UTRAN and SGSN are sent to the MME 14-2, including specific GPRS subscription data and authentication data, The MME 14-2 will forward the data to the assigned SGSN 14-1.

Therefore, less SS7 signalling between SGSN 14-1 and HSS 24 is needed. If the UE 12 attaches first to UTRAN 10-1 (as illustrated in FIGS. 9a, 9b), only a small amount of SS7 signalling is needed between SGSN 14-1 and HSS 24 until the UE 12 attaches in E-UTRAN 10-2. In this case, the MME 14-2 becomes master and all signalling is performed via the MME 14-2, thus no longer needing SS7.

Figure 11:
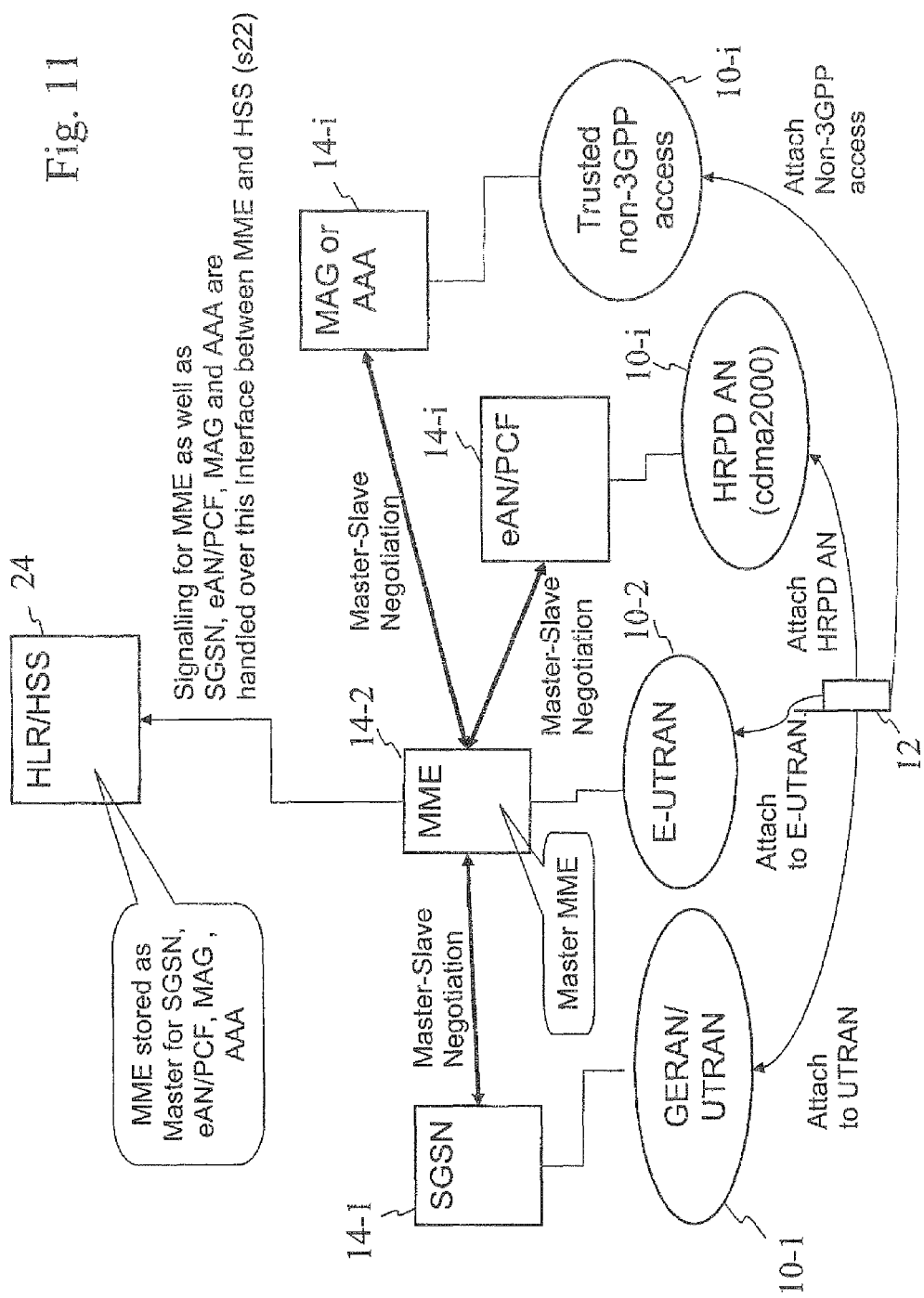
FIG. 11 schematically illustrates a third scenario, i.e. a third method, in one embodiment of the invention, with simultaneous attach in more than one RAN.

A third scenario, illustrated in FIG. 11, relates to a master-slave interaction on simultaneous registrations in more than two different RANs. The above-described first and second scenarios relate to mechanisms to determine a master serving entity when a UE is registered simultaneously in two RANs (UTRAN and E-UTRAN), as is possible when the ISR mode is supported in a 3GPP network. This mechanism is also applicable to the case of a UE being simultaneously registered to more than two different RANs (not necessarily 3GPP networks).

The mechanism is similar to the one described with reference to the first and second scenarios (related to 3GPP radio access networks) in the sense that:

(i) A UE 12 is registered in a plurality of different RANs 10-1, 10-2, 10-i. In the third scenario, there are more than two slave serving entities, namely three slave serving entities 14-1, 14-i, 14-i.

(ii) Upon attaching to each RAN 10-1, 10-2, 10-i, the UE 12 includes information on attach performed in other RANs. This enables the different control plane serving entities to easily determine the addresses of other control plane serving entities already assigned to that same UE 12 in other RANs.

(iii) A negotiation process is triggered between the different core network serving entities 14-1, 14-2, 14-i in order to determine which serving entity will be assigned the master role. In the above-described first and second scenarios and also in the third scenario, the MME 14-2 is assigned the master role.

(iv) The control plane signalling for all serving entities is then handled by the master MME 14-2, The signalling may include contacting s22 the HSS 24.

A fourth scenario (not illustrated in the drawings) relates to a master-slave interaction between circuit switch and any packet switch network. In the above-described scenarios with simultaneous registrations from multiple RANs 10-1, 10-2, 10-i, the UE 12 can typically only access one of the RANs 10-1, 10-2, 10-i at one point of time. In such scenarios, a mechanism like the ISR mode may avoid the workload implied by frequent registrations and de-registrations.

The usage of master control plane server entities and slave entities in the invention is also applicable to the case of multiple simultaneous attachments, without any requirement of mutual exclusion at one point in time.

An exemplary fourth scenario in the 3G system implies circuit-switched (CS) and packet-switched (PS) domains. In this case, for PS attached subscribers with CS capabilities, there are two simultaneous registrations towards the HLR 24. Those from the mobile switching center (MSC) or visitor location register (VLR) associated to the MSC, and from the SGSN.

By applying the fourth scenario and using for example the MSC/VLR as master serving entity and the SGSN as slave serving entity, the need for the Or interface may be removed, or at least limited to PS-only UEs. The opposite approach of using a master serving entity at the SGSN and the MSC/VLR as slave may also be desirable if there is preference towards using Gr or the S6 interface in the case of combined SGSN/MME.

In the fourth scenario, there may be a master-slave interaction between IP Multimedia Subsystem (IMS) entities and core network entities. A further extension is to allow a master-slave interaction between multimedia domain control plane serving entities and those in any core network such as for instance those previously described.

For example, a UE may initially register in a packet core network domain and later register in the IMS domain. Both registrations are handled by the HSS. In this case, it is possible to define a master control plane serving entity such as the MME, while the slave serving entity may be the proxy Call Session Control Function (P-CSCF) for example or the serving CSCF (S-CSCF) if the MME is located in the home network. In this case, the S6a interface from the MME is used in order to handle Cx signalling between a CSCF and a HSS (the Cx interface is used to communicate between I-CSCF/S-CSCF and HSS). The opposite is also possible, i.e. to define a master CSCF whereas the Cx interface then handles S6a signalling and the like.

A fifth scenario (not illustrated in the drawings) relates to master-slave interaction on handover.

If a UE performs an inter-SGSN change without changing the MME, the old SGSN indicates to the new SGSN the MME to which the master role is assigned. The new SGSN then notifies the master MME that a new SGSN has been assigned. The MME in turn updates the HSS and retrieves any data needed by the new SGSN.

If the UE performs inter-MME change, this may result in a re-negotiation of master-slave pair.

A sixth scenario relates to a master-slave interaction related to activated PDP context or EPS bearers, with a master MME and a slave SGSN. When a UE performs a "UE Requested PDN Connectivity" procedure, the MME may send an "Update Location Request" including the public data network gateway (PDN GW) address and the access point name (APN) to the HSS for mobility with non-3GPP accesses, as specified in clause 5.10.2 of reference [1]. Note that the usage of "may" in the above-statement is due to the dependency to the requirement for mobility with non-3GPP accesses. Under certain circumstances, sending the "Update Location Request" may become a mandatory requirement.

Although this is not covered by reference [1] or 3GPP TS 23.060: "General Packet Radio Service (GPRS); Service Description; Stage 2" (Release 7) v7.6.0, a similar updating towards the HSS may be required to support the mobility of connections towards multiple public data networks (PDNs) between 2G/3G accesses and LTE. The following is based on the assumption that the two above specification references are adapted to this requirement.

When an ISR-active UE performs a PDP context activation or secondary PDP context activation towards a SGSN having a slave relationship towards a master MME, the update procedure needed to update the HSS with the PDN GW address and the APN is not be sent directly towards the HSS, but towards the master MME. The MME in turn updates the HSS.

This enables optimizations by the MME, because it is immediately informed about the newly activated PDP context. The MME may for instance reserve resources or set up corresponding tunnels towards the current eNodeB in anticipation of a future handover to E-UTRAN.

A seventh scenario relates to a master-slave interaction related to activated PDP context or EPS bearers, with a master SGSN and a slave MME.

When an ISR-active UE performs a UE requested PDN connectivity procedure, the MME sends the update location request (as defined in clause 5.10.2 of reference [1]) towards the master SGSN instead of the HSS. The master SGSN in turn updates the HSS. The seventh scenario is based on the status of the two above specification references as of versions v8.0.0 and v7.6.0 respectively, without additional assumptions.

The physical entities according to the invention, including the serving entities and the UE, may comprise or store computer programs including instructions such that, when the computer programs are executed on the physical entities, steps according to one embodiment of the invention are carried out. The invention also relates to such computer programs for carrying out methods according to the invention, and to any computer-readable medium storing the computer programs for carrying out methods according to the invention.

Where the terms "serving entity", "server", "user equipment" (or "UE") are used herein, no restriction is made regarding how distributed these elements may be and regarding how gathered elements may be. That is, the constituent elements of a serving entity or server, or user equipment may be distributed in different software or hardware components or devices for bringing about the intended function. A plurality of distinct elements may also be gathered for providing the intended functionalities.

Any one of the above-referred elements of a serving entity or UE may be implemented in hardware, software, field-programmable gate array (FPGA), application-specific integrated circuit (ASICs), firmware or the like.

In further embodiments of the invention, any one of the above-mentioned serving entity is replaced by serving means, or by a serving unit, for performing the functions of the serving entity respectively. In further embodiments of the invention, any one of the above-described steps may be implemented using computer-readable instructions, for instance in the form of computer-understandable procedures, methods or the like, in any kind of computer languages (such as in C, C++, Java, Assembler, Visual Basic or the like), and/or in the form of embedded software on firmware, integrated circuits or the like.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. A method implemented by a first control plane server that is associated with a first radio access network (RAN) in which a user equipment is registered, the method comprising informing a network node about the location of the user equipment by the first control plane server, in accordance with a slave role assigned to the first control plane server, sending a signaling message to a second control plane server that is associated with a second RAN in which the user equipment is simultaneously registered, that is assigned a master role, and that is configured to perform control plane signaling on behalf of the first control plane server for informing the network node about said location.

2. The method of claim 1, wherein said network node is configured to maintain information about the location of different user equipment, and wherein the second control plane server is configured to interact with said network node on behalf of the first control place server.

3. The method of claim 1, further comprising negotiating with the second control plane server, based on the types of technologies of the first and second RANs, whether the first control plane server is to be assigned the slave role or the master role, and accepting assignment of the slave role in accordance with those negotiations.

4. The method of claim 1, further comprising negotiating with the second control plane server, based on the chronological order in which the user equipment registered with the first and second RANs, whether the first control plane server is to be assigned the slave role or the master role, and accepting assignment of the slave role in accordance with those negotiations.

5. A method implemented by a first control plane server for a first radio access network (RAN) in which a user equipment is registered, the method comprising:
receiving at the first control plane server a signaling message from a second control plane server that is for a second RAN in which the user equipment is simultaneously registered and that is assigned a slave role; and
responsive to the signaling message and in accordance with a master role assigned to the first control plane server, performing, by the first control plane server, control plane signaling on behalf of the second control plane server to inform a network node about the location of the user equipment.

6. The method of claim 5, wherein said network node is configured to maintain information about the location of different user equipment, and wherein performing control plane signaling on behalf of the second control plane server comprises interacting with the network node on behalf of the second control plane server.

7. The method of claim 5, further comprising negotiating with the second control plane server, based on the types of technologies of the first and second RANs, whether the first control plane server is to be assigned the slave role or the master role, and accepting assignment of the master role in accordance with those negotiations.

8. The method of claim 5, further comprising negotiating with the second control plane server, based on the chronological order in which the user equipment registered with the first and second RANs, whether the first control plane server is to be assigned the slave role or the master role, and accepting assignment of the master role in accordance with those negotiations.

9. The method of claim 5, further comprising:
detecting when the user equipment accesses a third RAN;
responsive to said detection, deciding whether or not to transfer the master role to a third control plane server for said third RAN, based on the type of technology of said third RAN; and
if it is decided to transfer the master role, transferring the master role to said third control plane server.

10. The method of claim 5, further comprising receiving, from the user equipment upon accessing said first RAN, information identifying one or more RANs to which the user equipment is already registered, and responsive to receiving said information, informing at least one of the identified RANs that the user equipment has accessed the first RAN.

11. A first control plane server for a first radio access network (RAN) in which a user equipment is registered, the first control plane server configured to inform a network node about the location of the user equipment by, in accordance with a slave role assigned to the first control plane server, sending a signaling message to a second control plane server that is for a second RAN in which the user equipment is simultaneously registered, that is assigned a master role, and that is configured to perform control plane signaling on behalf of the first control plane server for informing the network node about said location.

12. The first control plane server of claim 11, wherein said network node is configured to maintain information about the location of different user equipment, and wherein the second control plane server is configured to interact with said network node on behalf of the first control place server.

13. The first control plane server of claim 11, wherein the first control plane server is configured to negotiate with the second control plane server, based on the types of technologies of the first and second RANs, whether the first control plane server is to be assigned the slave role or the master role, and to accept assignment of the slave role in accordance with those negotiations.

14. The first control plane server of claim 11, wherein the first control plane server is configured to negotiate with the second control plane server, based on the chronological order in which the user equipment registered with the first and second RANs, whether the first control plane server is to be assigned the slave role or the master role, and to accept assignment of the slave role in accordance with those negotiations.

15. A first control plane server for a first radio access network (RAN) in which a user equipment is registered, the first control plane server configured to:
receive a signaling message from a second control plane server that is for a second RAN in which the user equipment is simultaneously registered and that is assigned a slave role; and
responsive to the signaling message and in accordance with a master role assigned to the first control plane server, perform control plane signaling on behalf of the second control plane server to inform a network node about the location of the user equipment.

16. The first control plane server of claim 15, wherein said network node is configured to maintain information about the location of different user equipment, and wherein the first control plane server is configured to perform control plane signaling on behalf of the second control plane server by interacting with the network node on behalf of the second control plane server.

17. The first control plane server of claim 15, wherein the first control plane server is configured to negotiate with the second control plane server, based on the types of technologies of the first and second RANs, whether the first control plane server is to be assigned the slave role or the master role, and to accept assignment of the master role in accordance with those negotiations.

18. The first control plane server of claim 15, wherein the first control plane server is configured to negotiate with the second control plane server, based on the chronological order in which the user equipment registered with the first and second RANs, whether the first control plane server is to be assigned the slave role or the master role, and to accept assignment of the master role in accordance with those negotiations.

19. The first control plane server of claim 15, wherein the first control plane server is configured to:
   detect when the user equipment accesses a third RAN;
   responsive to said detection, decide whether or not to transfer the master role to a third control plane server for said third RAN, based on the type of technology of said third RAN; and
   if it is decided to transfer the master role, transfer the master role to said third control plane server.

20. The first control plane server of claim 15, wherein the first control plane server is configured to:
   receive, from the user equipment upon accessing said first RAN, information identifying one or more RANs to which the user equipment is already registered; and
   responsive to receiving said information, inform at least one of the identified RANs that the user equipment has accessed the first RAN.

21. A first control plane server that is associated with a first radio access network (RAN) in which a user equipment is registered and that is configured to:
   selectively operate in a master role or a slave role with respect to a second control plane server that is associated with a second RAN in which the user equipment is also registered;
   when operating in the slave role, inform a network node about the location of the user equipment by sending a signaling message to the second control plane server, the second control plane server being configured to perform control plane signaling on behalf of the first control plane server for informing the network node about said location; and
   when operating in the master role, receive a signaling message from the second control plane server, and, responsive to the signaling message, perform control plane signaling on behalf of the second control plane server to inform the network node about the location of the user equipment.

22. The first control plane server of claim 11, configured to send control plane signaling messages to and receive control plane signaling messages from the network node indirectly via the second control plane server such that the second control plane server acts as a control plane signaling proxy for the first control plane server.

23. The first control plane server of claim 11, wherein the second control plane server is configured to perform control plane signaling on behalf of the first control plane server for some but not all control plane signaling so as to partially alleviate the need for the first control plane server to interface with the network node, wherein the first control plane server is configured to send one or more other signaling messages directly to the network node, rather than sending those one or more other signaling messages indirectly to the network node via the second control plane server as a control plane signaling proxy.

24. The first control plane server of claim 11, wherein the network node is a location register database and wherein informing the network node about the location of the user equipment comprises inserting the user equipment's location into the location register database.

25. The first control plane server of claim 11, wherein the network node is a home location register (HLR) or home subscriber server (HSS).

26. The first control plane server of claim 25, wherein the first control plane server is a serving General Radio Packet Service (GRPS) support node (SGSN), and wherein the first control plane server sends one or more control plane signaling messages to the HLR or HSS via an interface to the second control plane server, wherein said interface is not a Signaling System #7 (SS7) interface.

27. The first control plane server of claim 15, wherein the first control plane server, in accordance with a master slave role, is further configured to:
   indicate to the network node to send a message to the second control plane server by sending the message indirectly via the first control plane server instead of directly sending the message to the second control plane server;
   receive said message from the network node as a proxy for the second control plane server; and
   send said message to the second control plane server.

* * * * *

UNITED STATES PATENT AND TRADEMARK OFFICE
CERTIFICATE OF CORRECTION

PATENT NO. : 9,288,780 B2
APPLICATION NO. : 13/256092
DATED : March 15, 2016
INVENTOR(S) : Walker et al.

Page 1 of 2

It is certified that error appears in the above-identified patent and that said Letters Patent is hereby corrected as shown below:

Title page, item (57), "ABSTRACT", in Column 2, Line 13, delete "signalling" and insert -- signalling. --, therefor.

Specification

In Column 2, Line 27, delete "US" and insert -- UE --, therefor.

In Column 7, Line 24, delete "access," and insert -- access. --, therefor.

In Column 7, Line 26, delete "E-UTRAN 514-2" and insert -- E-UTRAN 510-2 --, therefor.

In Column 7, Line 26, delete "(wherein." and insert -- (wherein --, therefor.

In Column 7, Line 60, delete ""1, Attach Request (P-TMST if available and/or S-TMST" and insert -- "1. Attach Request (P-TMSI if available and/or S-TMSI --, therefor.

In Column 7, Line 63, delete "S-TMST" and insert -- S-TMSI --, therefor.

In Column 7, Line 65, delete ""2," and insert -- "2. --, therefor.

In Column 7, Line 66, delete "(P-TMST," and insert -- (P-TMSI, --, therefor.

In Column 8, Line 8, delete "(P-TMST" and insert -- (P-TMSI --, therefor.

In Column 8, Line 11, delete ""5," and insert -- "5. --, therefor.

In Column 8, Line 12, delete "(S-TMST," and insert -- (S-TMSI, --, therefor.

In Column 8, Line 32, delete "TSR" and insert -- ISR --, therefor.

In Column 9, Line 57, delete "RANE." and insert -- RANs. --, therefor.

In Column 11, Line 5, delete "a S-TMSI" and insert -- an S-TMSI --, therefor.

Signed and Sealed this
Nineteenth Day of July, 2016

Michelle K. Lee
*Director of the United States Patent and Trademark Office*

Specification

In Column 11, Line 17, delete "12)," and insert -- 12). --, therefor.

In Column 11, Line 46, delete "TSR" and insert -- ISR --, therefor.

In Column 12, Line 13, delete "US's" and insert -- UE's --, therefor.

In Column 12, Line 21, delete "UF" and insert -- UE --, therefor.

In Column 13, Line 2, delete "14-2," and insert -- 14-2. --, therefor.

In Column 13, Line 25, delete "Or" and insert -- Gr --, therefor.

Claims

In Column 15, Line 27, in Claim 2, delete "place" and insert -- plane --, therefor.

In Column 16, Line 36, in Claim 12, delete "place" and insert -- plane --, therefor.